E. T. POWELL.
BAGGAGE CARRIER.
APPLICATION FILED FEB. 6, 1920.
1,402,958.
Patented Jan. 10, 1922.
2 SHEETS—SHEET 1.
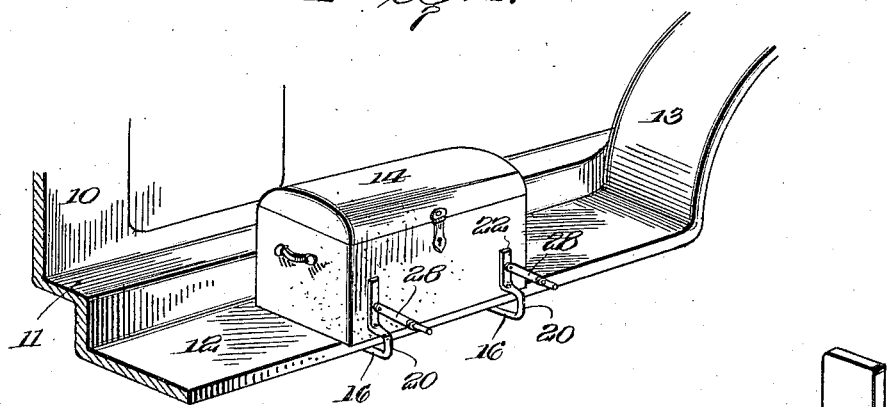
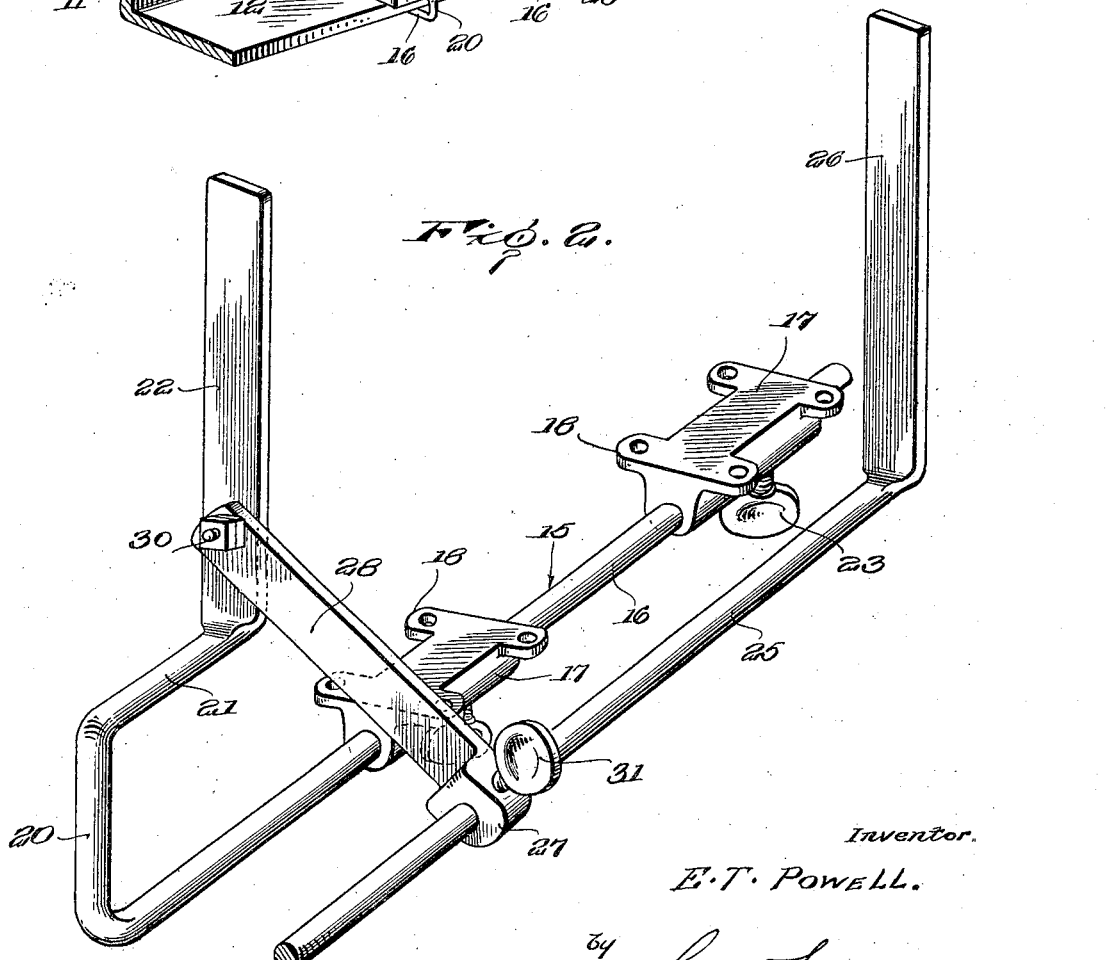
Inventor.
E. T. Powell.
by Lacey & Lacey,
his Attys.

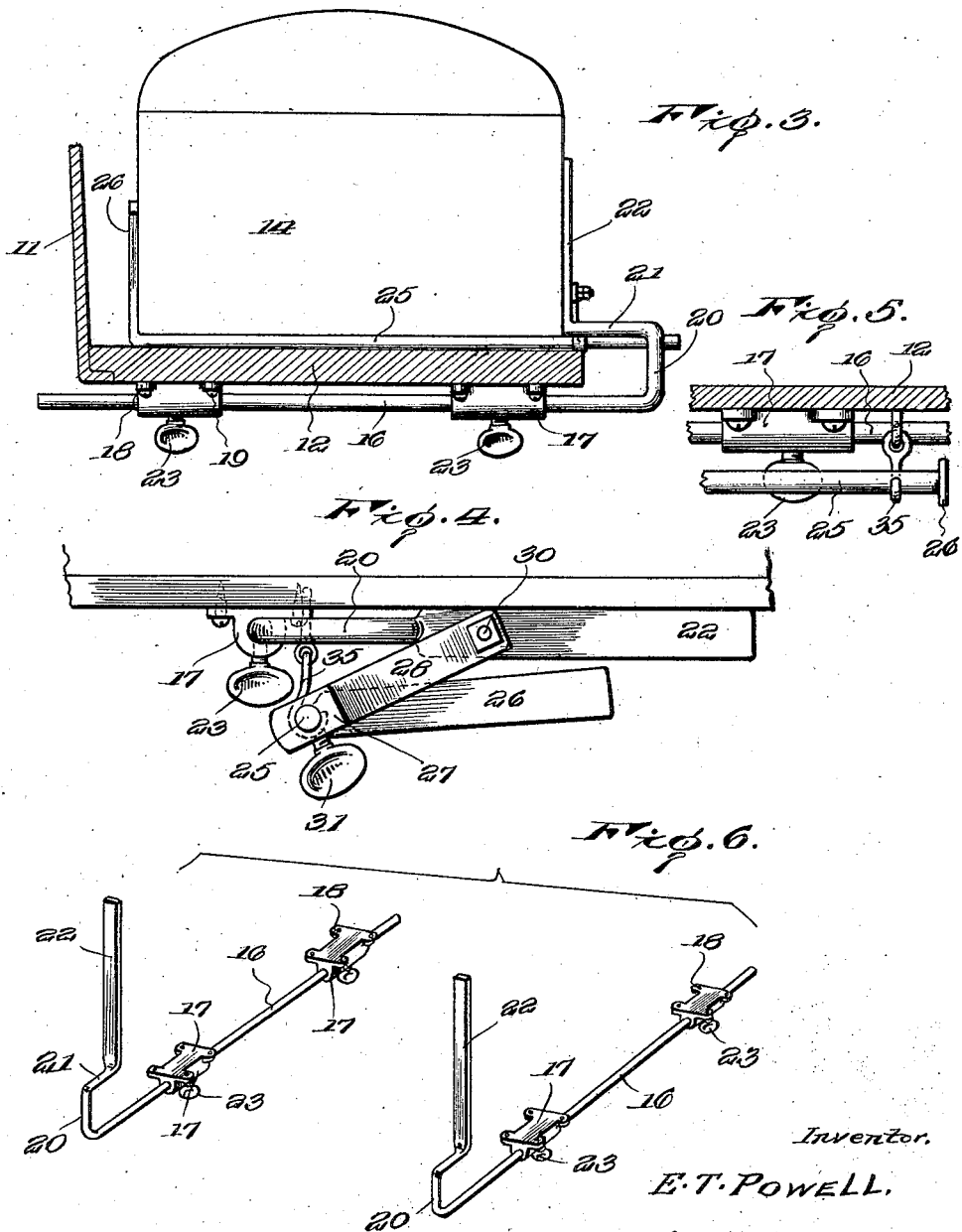

UNITED STATES PATENT OFFICE.

EDWIN T. POWELL, OF WACHAPREAGUE, VIRGINIA, ASSIGNOR OF ONE-HALF TO JOHN T. POWELL, OF WACHAPREAGUE, VIRGINIA.

BAGGAGE CARRIER.

1,402,958.

Specification of Letters Patent. Patented Jan. 10, 1922.

Application filed February 6, 1920. Serial No. 356,587.

*To all whom it may concern:*

Be it known that I, EDWIN T. POWELL, a citizen of the United States, residing at Wachapreague, in the county of Accomac and State of Virginia, have invented certain new and useful Improvements in Baggage Carriers, of which the following is a specification.

This invention relates to improvements in article carriers especially adapted for use on the running boards of motor vehicles.

An important object of this invention is to provide an article carrier adapted to be secured to the running board of a motor vehicle and provided with novel means whereby the articles engaged may be spaced from the apron and body of the vehicle so as not to mar or dent the apron or the body.

A further object of the invention is to provide an article carrier adapted to be applied to the running board of a motor vehicle and capable of being positioned entirely beneath the running board when not in use, so that the same may be practically concealed from view.

A further object of the invention is to provide an article carrier having novel means whereby the same may be employed for securing different size articles, such as trunks, tool boxes, battery boxes and the like, to the running board of a vehicle.

A further object of this invention is to provide an article carrier which is of highly simplified construction, simple to adjust and cheap to manufacture.

Other objects and advantages of the invention will be apparent during the course of the following description.

In the accompanying drawings forming a part of this application and in which like numerals are employed to designate like parts throughout the same, Figure 1 is a perspective of the improved article carrier applied, Figure 2 is a perspective of the device detached, Figure 3 is a transverse section through a running board having the improved article carrier connected thereto, Figure 4 is an end elevation of the improved article carrier folded beneath the running board, Figure 5 is a fragmentary side elevation of the article carrier folded beneath the running board, Figure 6 is a group perspective of a modified form of article carrier.

In the drawings wherein for the purpose of illustration are shown several preferred embodiments of the invention, the numeral 10 designates the body of a vehicle having an apron 11 extended downwardly and outwardly from its lower side and connected to a longitudinally extending running board 12. The forward end of the running board 12 is connected to a front fender 13 which, as usual, extends over one front wheel of the vehicle.

Briefly stated, this invention aims to provide an efficient means whereby an article such as a tool box 14 may be detachably secured upon the running board in spaced relation to the apron 11 and the body 10 so as to prevent scratching or denting of the same as the result of continued vibration of the vehicle. With this in view, I have provided a pair of article carriers designated by the numeral 15, each of which includes a rod 16 of cylindrical formation extended through longitudinally alined sleeves 17 which, as illustrated in Figure 3, are provided with pairs of laterally projecting apertured ears 18 secured to the under side of the running board by screws 19 or other suitable fastening devices. The sleeves 17 have their common axes extended transversely of the running board so that when the rod 16 is extended through the sleeves, the same may be disposed transversely of the running board. The rod 16 is arranged in L-shaped formation at a point spaced inwardly from its forward end to provide a vertical arm 20 and a horizontal arm 21 adapted to overhang the running board in spaced parallel relation to the body of the rod. The portion of the rod beyond the horizontal arm 21 is flattened and is extended at a right angle to the major portion of the rod to form an article engaging arm 22 which may be brought flatly into contact with the front side of the box 14 by an inward longitudinal movement of the rod 16 through the sleeves 17. When the arm 22 has been brought securely into contact with the front side of the box or other article 14, set screws 23 having threaded engagement with the under sides of the sleeves may be tightened for securing the rod against rotation and longitudinal movement whereby the arm 22 is positively held in position. If the particular construction of the article arranged upon the running board does not allow the arm 22 to be arranged vertically upon being engaged with the same, the arm may be arranged in an inclined position by a partial rotation of the rod 16. That is to say, if the locking means for the cover of the box or trunk interfere with the vertical arrangement of the arms, the arms may be arranged at the sides of the locking means.

With particular reference to Figure 3, it will be observed that the article secured to the running board by the carrier is spaced outwardly from the apron 11 so that the apron will not be scratched or dented through contact with the tool box or trunk or other article. The means for securing the article in spaced relation to the apron and the body and for cooperating with the arm 22 in securing the article in position includes a rod 25 arranged in spaced parallel relation to the rod 16 and having its forward portion flattened and extended upwardly to form an article engaging arm 26. As illustrated in Figure 3, the article engaging arm is adapted to be arranged in spaced parallel relation to the arm 22 upon being engaged with the rear side of the article arranged upon the running board. The forward portion of the rod 25 is slidably and rotatably extended through the apertured head 27 of a link 28 pivotally connected at one end portion to the lower portion of the arm 22 by a pivot element 30. A set screw 31 is threaded into the head 27 of the link and is adapted to engage the rod 25 to secure the same against longitudinal movement or rotation after being adjusted.

In applying the improved carrier to a motor vehicle, the sleeves 17 are secured to the under side of the running board in longitudinal alinement so that the same may slidably and rotatably receive the rod 16. After the rod 16 has been extended through the longitudinally alined sleeve 17, the arm 22 is brought flatly into contact with the front side of the article mounted upon the running board. In case the tool box or other article carried by the running board does not extend to the outer edge of the same, the horizontal portion 21 of the rod may be positioned over the running board, as illustrated in Figure 3. The rod 25, of course, drops flatly upon the top of the running board through force of gravity and the same may be rotated to bring the arm 26 flatly into contact with the rear side of the box. When the arms 22 and 26 have been securely engaged with the box or other article mounted upon the running board, the set screws 23 and 31 are securely engaged with the rods 16 and 25 respectively so as to secure the rods against longitudinal movement or accidental rotation. By this construction the tool box or other article is held in a set position upon the running board and is prevented from transverse or longitudinal movement as the result of vibration of the vehicle. It will be observed that the arms 22 terminate below the top of the box so that the hinged cover of the same may be freely opened and closed without interference by the arms.

When it is desired to collapse or fold the carrier, the rod 25 is moved outwardly to position the upright arm 26 carried by the same adjacent the outer edge of the running board. The rod 16 is now moved outwardly after loosening the set screws 23 so as to permit the arm 26 to be dropped entirely beneath the running board with the arm 22 and the link 28. The rods 16 and 25 are moved inwardly after being positioned beneath the running board so as to conceal as much of the device as possible. As indicated in Figure 4, one end portion of the rod 25 is adapted to be engaged by a hanger 35 in the form of a hook suspended from the under side of the running board. The hook 35 serves as an efficient means whereby the device may be detachably positioned beneath the running board when not in use.

In the form of the invention illustrated in Figure 6, each of the carriers dispenses with the use of the link 28 and the rod 25 and the arm 22 is employed to press the rear side of the box or other article flatly into contact with the apron of the vehicle. This form of the invention, however, is employed where there is no particular need of spacing the article arranged upon the running board from the apron of the vehicle. When it is desired to arrange the device shown in Figure 6 beneath the running board, the screws 23 of the sleeves 17 may be loosened whereby the rod 16 may be moved outwardly, downwardly and then inwardly. After the arm 22 has been positioned beneath the running board, the screws 23 may again be tightened for preventing the arm from accidental movement. In the other form of the invention, the screws 23 also serve as a means for assisting in holding the device in a folded position beneath the running board.

With reference to the foregoing description taken in connection with the accompanying drawings, it will be observed that an article carrier constructed in accordance with this invention may be readily and conveniently applied to the running boards of motor vehicles without in any way altering the construction of the vehicle or without interfering with any of the moving parts of the same.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

1. An article carrier for vehicle running boards comprising a sleeve, a rod slidably and rotatably extending through said sleeve and being extended upwardly and inwardly at a point forwardly of said sleeve for overhanging the running board, the forward portion of said rod being flattened and arranged at right angles to the major portion of said rod for forming an arm adapted for engaging the front side of an article mounted upon the running board, means swingingly carried by said arm for securely engaging the rear side of the article whereby the article is spaced from the vehicle apron, and means for securing said arm and the first named means in an inclined or vertical position in engagement with the front and rear sides of the article.

2. An article carrier for vehicle running boards comprising a rod, means to slidably and rotatably support said rod, the forward portion of said rod being extended angularly for forming an arm adapted to engage the forward side of an article mounted upon the running board, and a second rod swingingly carried by and arranged in spaced relation to said first named rod and having one end portion extended angularly for forming a second arm adapted for engaging the rear side of the article mounted upon the running board.

3. An article carrier for vehicle running boards comprising a rod, means to slidably and rotatably support the rod, one end portion of said rod being extended angularly for forming an arm adapted for engaging the front side of an article mounted upon the running board, a second rod having one end portion extended angularly to form a second arm adapted for engaging the rear side of the article, means to secure said first and second named arms in an adjusted position with relation to the article engaged, and a hanger for supporting said first and second named rods beneath the running board.

4. An article carrier for vehicle running boards comprising a rod, means to slidably and rotatably support the rod, one end portion of said rod being extended angularly for forming an arm adapted for engaging the front side of an article mounted upon the running board, a link horizontally pivoted at one end to said arm, a second rod slidably and rotatably extending through the other end of the link in spaced relation to said first named rod, said second named rod having one end portion formed with an arm adapted to engage the rear side of the article to space the same from the vehicle apron, and means whereby said first and second named arms and said link may be detachably secured beneath the running board.

5. The combination with a vehicle running board and an apron extending along the inner side of the same, of a sleeve carried by the running board, a rod slidably and rotatably carried by said sleeve and having one end portion formed with an arm adapted for engaging the outer side of an article mounted upon the running board, a link pivoted at one end to said arm, a rod adjustably carried by the other end of said link in spaced parallel relation to said first named rod and having one end portion provided with an arm adapted for engaging the rear side of the article, and means whereby said first and second named arms and said link may be secured beneath said running board.

In testimony whereof I affix my signature in presence of two witnesses.

EDWIN T. POWELL. [L. S.]

Witnesses:
J. A. FRULINGTON,
W. T. FOSQUE.